May 15, 1962 M. J. HILLMAN 3,035,234
PULSE MODULATION TRANSMISSION SYSTEMS OR THE LIKE
Filed Oct. 11, 1954
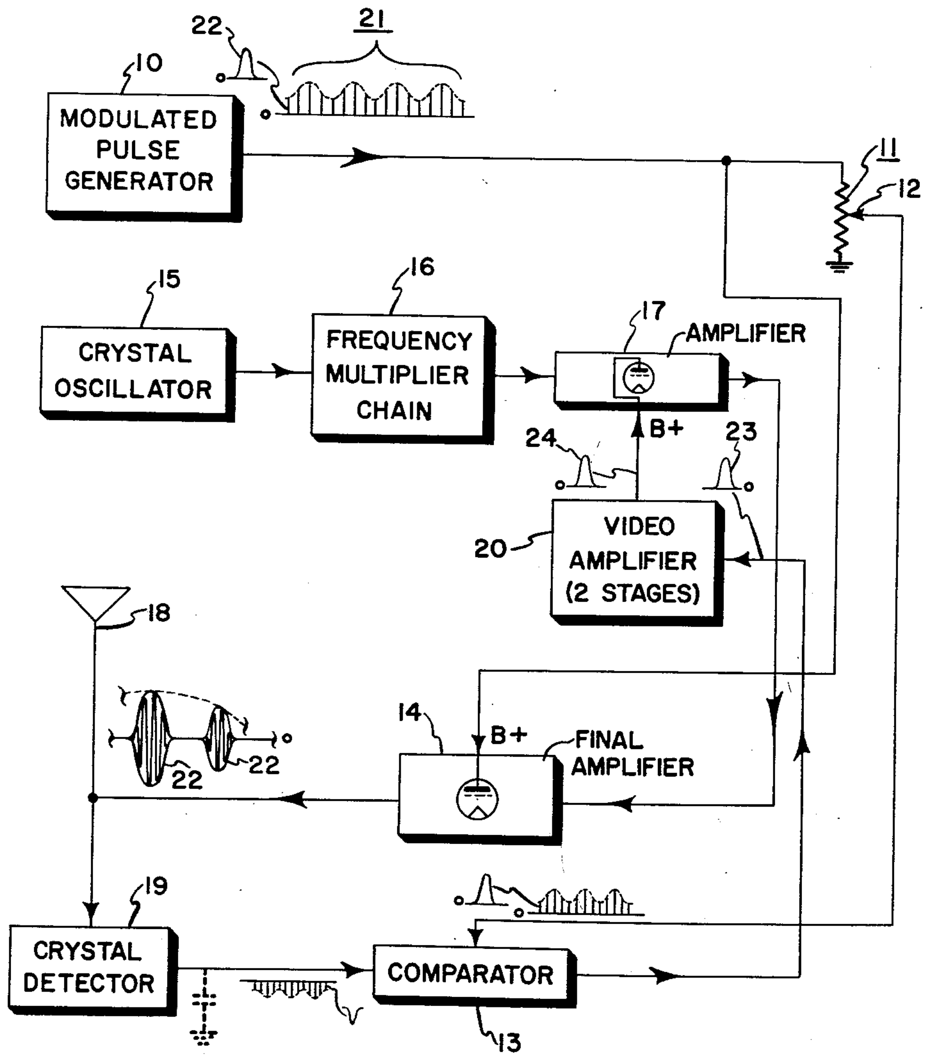
MURRAY J. HILLMAN
*INVENTOR.*
BY [signature]
HIS ATTORNEY

United States Patent Office 3,035,234

Patented May 15, 1962

3,035,234

PULSE MODULATION TRANSMISSION SYSTEMS OR THE LIKE

Murray J. Hillman, San Gabriel, Calif., assignor to Hoffman Electronics Corporation, a corporation of California Filed Oct. 11, 1954, Ser. No. 461,320
3 Claims. (Cl. 332—10)

This invention is related to pulse modulation transmission systems, and more particularly, to an improved pulse modulation transmission system which exhibits, by virtue of its unique design, a constant peak power output level despite inherent transmitter variations, and linearity in the modulation characteristic of the transmitter.

In the past, many types of pulse modulation transmission systems have been devised for use in navigation and communications systems. Pulse modulation systems presently employed appear to be deficient in certain respects. Some of the notable deficiencies are: unwanted variations in output power, tendencies on the part of the transmitter to exhibit output pulses of varying wave shape, and variations in transmitter modulation characteristics.

Therefore, it is an object of the present invention to provide a new and useful pulse modulation transmission system which will exhibit optimum performance.

It is a further object of the present invention to provide a new and useful pulse modulation transmission system which will exhibit an over-all constant output power level, a uniform output signal of constant wave shape, and linearity in the modulation characteristic of the transmitter.

According to the present invention, the final amplifier of an RF carrier source is supplied a positive operating voltage (B+) by a signal generated by a modulated pulse train generator. The transmitter output signal and the modulated pulse generator signal are sampled by a comparator which produces appropriate B+ voltage to supply, ultimately, a preceding RF carrier amplifier stage. This output comparator signal is responsive in amplitude to differences in magnitude of the signals from the modulated pulse generator source and the RF carrier source, and causes appropriate B+ voltage to be supplied the aforementioned preceding carrier source amplifier stage, thus enabling a constant peak power level output, a stabilized output wave shape, and a constant percentage modulation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole FIGURE is a block diagram of a pulse modulation transmission system, according to the present invention.

In the sole FIGURE modulated pulse generator 10 is coupled through potentiometer 11 to ground. Adjustable tap 12 of potentiometer 11 is coupled to a first input circuit of comparator 13. Modulated pulse generator 10 is also coupled to final amplifier 14 for supplying B+ voltage thereto. The RF carrier source for the pulse modulation transmission system, according to the present invention, consists of crystal oscillator 15, frequency multiplier chain 16, amplifier 17, and final amplifier 14, which are coupled together in that order. Amplifiers 14 and 17 may consist of either triode amplifiers or tetrode amplifiers having appropriate operating points. The output signal from final amplifier 14 is coupled to transmitting antenna 18 and also to crystal detector 19. Crystal detector 19 is coupled to the second input circuit of comparator 13. The output signal from comparator 13 is coupled through video amplifier 20 to amplifier 17 to supply B+ voltage thereto.

The circuit shown in the sole FIGURE operates as follows. Modulated pulse generator 10 generates modulated pulse train 21, each pulse having a wave shape similar to pulse 22. Pulse train 21 serves to supply intermittent B+ voltage to final amplifier 14. In actual practice, the pulse repetition frequency of pulse train 21 will be much less than the frequency of the output signal from frequency multiplier chain 16. Hence, the output signal from final amplifier 14 will be an intermittent R.-F. signal having a sub-envelope corresponding to the wave shape of the several pulses 22, and an over-all envelope corresponding to the modulation envelope of pulse train 21. If the inherent characteristics of the R.-F. portion of the system are such as to cause distortion of the modulating signal in any one or all of a number of details, for example in percentage modulation, wave shape, or output power level, then crystal detector 19 in combination with comparator 13 and video amplifier 20 will serve to correct the distortion. This is accomplished as follows. Pulse train 21 from modulated pulse generator 10 is sampled through potentiometer 11 by comparator 13. The output signal from final amplifier 14 in turn is sampled by crystal detector 19, the output from which is also fed to comparator 13. The crystal detector as here employed serves in part as a low-pass filter, by virtue of the R.-F. by-pass capacitance offered by the grounded crystal holder and also by reason of the low frequency response at the high end of the frequency range owing to inherent crystal rectifier properties, so that the R.-F. energy within the pulse envelope of the output signal will not appear in the input circuitry of comparator 13, and also serves as a rectifier to supply comparator 13 with only the negative portions of the pulse envelope. If required, a separate grounded R.-F. by-pass capacitor may be coupled to the output side of crystal detector 19. For a given set of system parameters, tap 12 of potentiometer 11 will be adjusted so that the instantaneous algebraic sum of the voltage magnitudes of pulse train 21 from modulated pulse generator 10 and the negative pulse train from crystal detector 19 will be of the proper value to drive video amplifier 20 so that it supplies appropriate B+ voltage to amplifier 17 of such a wave shape that the shape of the output wave from amplifier 14 will represent the modulating wave with fidelity. Let it be assumed for the moment that the system parameters change so as to decrease the output power of the signal from final amplifier 14. In this case, the magnitude of the negative pulse train from crystal detector 19 will be reduced. Hence, the magnitudes of the pulses from the output pulse train of comparator 13 will severally increase. Video amplifier 20 is shown to consist of two stages in order that the phase relations of the comparator error signal be preserved. The increase in amplitude of comparator error signal pulses 23 will produce an increase in amplitude in the several output pulses 24 from video amplifier 20. Thus, the positive operating voltage applied to amplifier 17 will be increased and accordingly the R.-F. output from amplifier 17 will also increase. Hence, by choosing proper values for circuit elements, the gain, percentage modulation and wave shape of the output signal from final amplifier 14 will be preserved in their essential features.

Conceivably, an alternate approach to the problem of insuring stabilized output of the pulse modulation transmission system according to the present invention would be to vary appropriately B+ voltage to the anode and screen electrodes of a single power amplifier, that is, to apply the output B+ voltage pulses from video amplifier 20 and from modulated pulse generator 10 to a single amplifier stage. From a practical viewpoint, however, it is believed that it is preferable to use the two-stage B+ modulation shown in the sole FIGURE because it will provide a higher degree of stability in system performance.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A modulated pulse transmitter including a source of high frequency oscillations, a first amplifier including an electron discharge device having its input coupled to said source, a second amplifier including an electron discharge device having its input connected to the output of the first amplifier, a source of modulated, unidirectional pulses directly connected to the second amplifier such that the pulses provide a modulated pulsed power supply therefor to produce a correspondingly pulsed carrier, a signal detector coupled to the output of said second amplifier and providing modulated pulses of one polarity, a comparison circuit having a first input coupled to the output of said detector, a second input coupled to the modulated pulse source for receiving modulated pulses of an opposite polarity and relatively higher amplitude than those at the first input, and an output circuit providing modulated pulses representing the algebraic sum of the input pulses; and means directly coupling the output of the comparison circuit to the first amplifier to provide a modulated pulsed power supply therefor.

2. A modulated pulse transmitter in accordance with claim 1 in which the means directly coupling the output of the comparison circuit to the first amplifier is a broad-band amplifier having its input coupled to the output of the comparisoin circuit and its output directly connected to the first amplifier.

3. A modulated pulse transmitter in accordance with claim 2 in which the electron discharge devices of the first and second amplifiers comprise vacuum tubes having at least one control grid, a cathode and an anode; the modulated pulse source and output of the broad-band amplifier being respectively connected to the anodes of said tubes to form the modulated pulsed power supply therefor.

References Cited in the file of this patent

UNITED STATES PATENTS

| | | |
|---|---|---|
| 2,182,790 | Craft | Dec. 12, 1939 |
| 2,191,454 | Craft | Feb. 27, 1940 |
| 2,227,505 | Kummerer | Jan. 7, 1941 |
| 2,298,930 | Decino | Oct. 13, 1942 |
| 2,310,260 | Schock | Feb. 9, 1943 |
| 2,705,775 | Crosby | Apr. 5, 1955 |
| 2,764,738 | Bush | Sept. 25, 1956 |